United States Patent [19]

Moe

[11] Patent Number: 4,736,091

[45] Date of Patent: Apr. 5, 1988

[54] INTEGRAL SENSOR CONTROLLER FOR AN ELECTRICAL HEATER

[75] Inventor: John L. Moe, Winona, Minn.

[73] Assignee: Watlow/Winona, Inc., Winona, Minn.

[21] Appl. No.: 905,461

[22] Filed: Sep. 10, 1986

[51] Int. Cl.[4] .................................................. A05B 1/02
[52] U.S. Cl. ................................... 219/505; 219/501; 219/508; 219/497; 323/235; 307/647
[58] Field of Search ............... 219/501, 497, 494, 499, 219/506, 504; 307/117, 310, 252 B, 252 UA; 323/235, 319, 236

[56] References Cited

U.S. PATENT DOCUMENTS

| | | | |
|---|---|---|---|
| 3,700,933 | 10/1972 | Harkenrider et al. | 323/235 |
| 3,745,308 | 7/1973 | Leffets | 219/497 |
| 3,758,844 | 9/1973 | Harkenrider et al. | 219/497 |
| 3,789,190 | 1/1974 | Orosy et al. | 219/501 |
| 4,002,882 | 1/1977 | McCutchen | 219/497 |
| 4,546,238 | 10/1985 | Ahs | 219/499 |
| 4,554,439 | 11/1985 | Cross et al. | 219/497 |
| 4,567,353 | 1/1986 | Aiba | 219/497 |
| 4,594,501 | 6/1986 | Culley et al. | 219/497 |
| 6,765,046 | 7/1972 | Harkenrider et al. | 323/235 |

Primary Examiner—M. H. Paschall
Attorney, Agent, or Firm—Hugh D. Jaeger

[57] ABSTRACT

Integral sensor controller for an electrical resistance heater, where the heater is constructed from materials such as nickel, balco, platinum, alumel, or like materials which have an appreciable, positive temperature coefficient of resistivity. The resistance versus temperature characteristic of the heater acts as the temperature sensor. A low level D.C. current provides a sensor voltage which is compared to a set point voltage for switching the heater power through a transistor. The relationship of the sensor voltage to the set point voltage is compared by a comparator which is subsequently used to toggle flip flops for switching of the heater power. Circuitry is provided for protection against heater short circuits.

7 Claims, 4 Drawing Sheets

INTEGRAL SENSOR CONTROLLER FOR AN ELECTRICAL HEATER

BACKGROUND OF THE INVENTION

1. Field of the Invention

The present invention pertains to a controller for an electrical resistance heater, and more particularly, pertains to an integral sensor controller for an electrical resistance heater where the electrical resistance heater exhibits a positive temperature coefficient of resistivity, which provides for control of the electrical heater by using the resistance versus temperature characteristic of the heater.

2. Description of the Prior Art

Representative prior art patents include U.S. Pat. Nos. 3,675,046 and 3,700,933, for heater control circuits where a load is pulsed with energy to monitor the condition of the load. U.S. Pat. No. 3,758,844 provides a heater control circuit which also provides for zero switching and overload protection.

SUMMARY OF THE INVENTION

The general purpose of the present invention is a controller for an electrical resistance heater by using the resistance versus temperature characteristic of the heater as the heaters own temperature sensor. The heater is constructed from materials such as balco, platinum, alumel, or other like materials which have an appreciable, positive temperature coefficient of resistivity.

According to one embodiment of the present invention, there is provided an integral sensor controller for an electrical resistance heater, including a power source which is applied to terminals of the heater as well as for powering the control circuitry of the heater. The circuitry generates a clock pulse at each zero crossing of the supply voltage which is used to toggle flip flops. The heater is excited by a low level D.C. sensor current so that the current value times a nominal sensor resistance results in a voltage that is higher than the full wave voltage at the zero crossing for a time period of 400 micro seconds on each side of the zero value. In this time interval, a control amplifier amplifies a sensor voltage which is compared to the set point voltage and which is set by a potentiometer. The output of the control amplifier toggles the flip flop which controls a switching transistor, subsequently controlling power to the heater. The circuitry also includes short circuit protection by sensing the output of the control amplifier which toggles the flip flops accordingly.

Significant aspects and features of the present invention include utilizing an electrical resistance heater as the heater's own temperature sensor. Also, the electrical resistance heater is constructed with a material which has an appreciable, positive temperature coefficient of resistivity.

Other significant aspects and features of the present invention is a low level D.C. sensor current which always excites the heater but does not substantially contribute to the heating of the heater. The sensor current is selected so that the current value times the nominal sensor resistance at room temperature results in a voltage that is higher than temperatures results in a voltage that is higher than the full wave voltage at zero crossing for a finite time period preceding the zero value and following the zero value thereby providing a window for sensing. This timing relationship at the zero crossing with a clock pulse, which is generated at each zero crossing of the supply voltage, is subsequently superimposed in the sensing window.

Having thus described principle embodiments of the present invention, it is a principle object hereof to provide controlling of an electrical heater by using the resistance versus temperature characteristic of the heater as the heater's own temperature sensor.

One object of the present invention is to construct a heater using wire materials which have an apprciable, positive temperature coefficient of resistivity.

Another object of the present invention is to excite the heater by a low level D.C. sensor current which does not significantly contribute to the heating of the heater, and so that the current value times the nominal heater resistance will result in a voltage that is higher than the full wave voltage at a zero crossing for a time period preceding the zero value and following the zero value. This provides a sensing window with respect to the clock pulse

DESCRIPTION OF THE PREFERRED EMBODIMENTS

Figure 1:
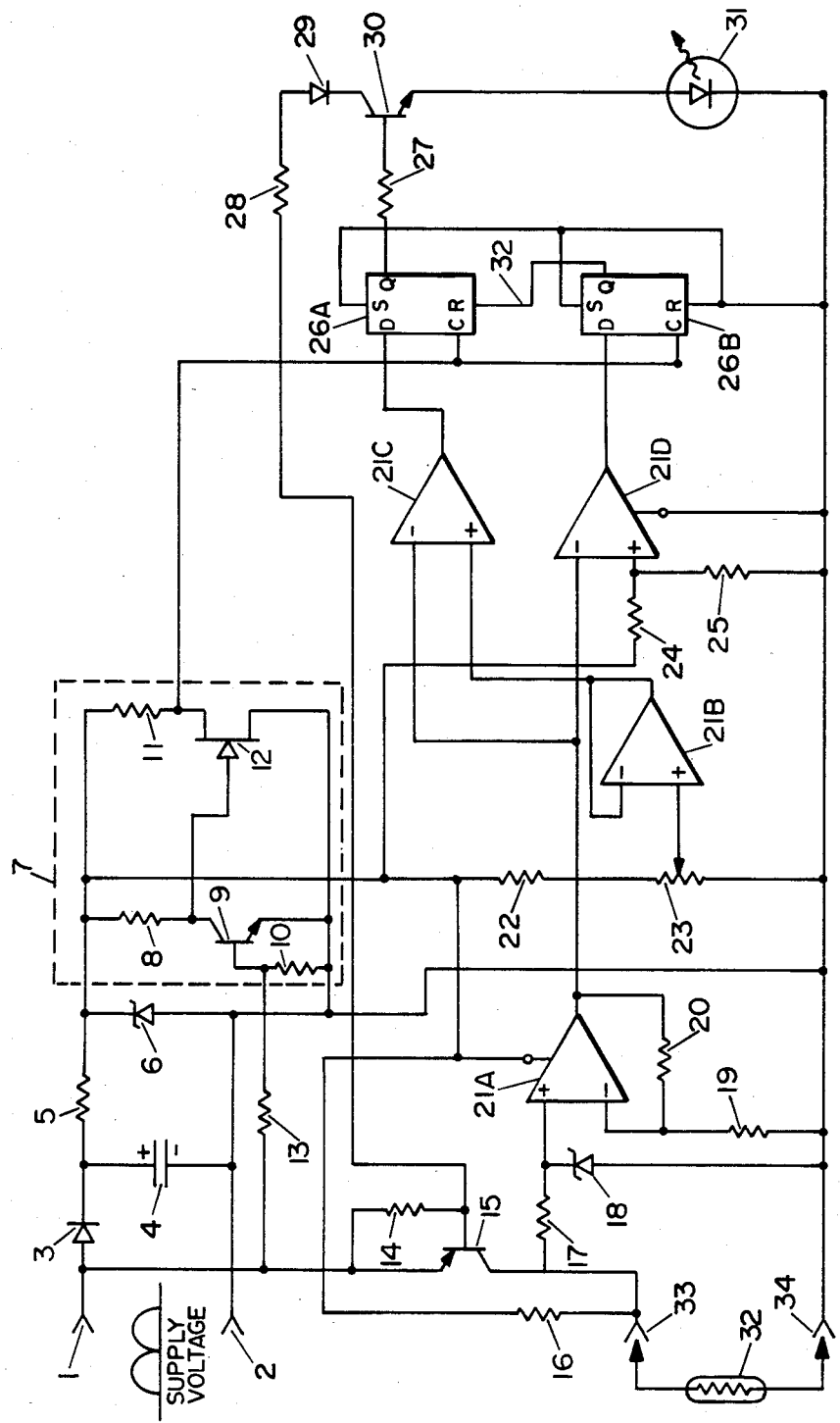
FIG. 1 illustrates an electrical circuits schematic diagram of the integral sensor controller for an electrical heater.

FIG. 1 illustrates an electrical control circuit schematic diagram for an integral sensor controller for controlling an electrical resistance heater 32 connected by terminals 33 and 34. The supply voltage of the power source is full wave rectified A.C., and is applied to terminals 1 and 2. The full wave unfiltered voltage is also the source for the heater power through a controller transistor 15. The full wave voltage also is used to power the control circuitry by charging a filter capacitor 4, through a rectifier 3. Resistor 5 and zener diode 6 form a voltage regulator that powers the control circuit.

Figure 3:
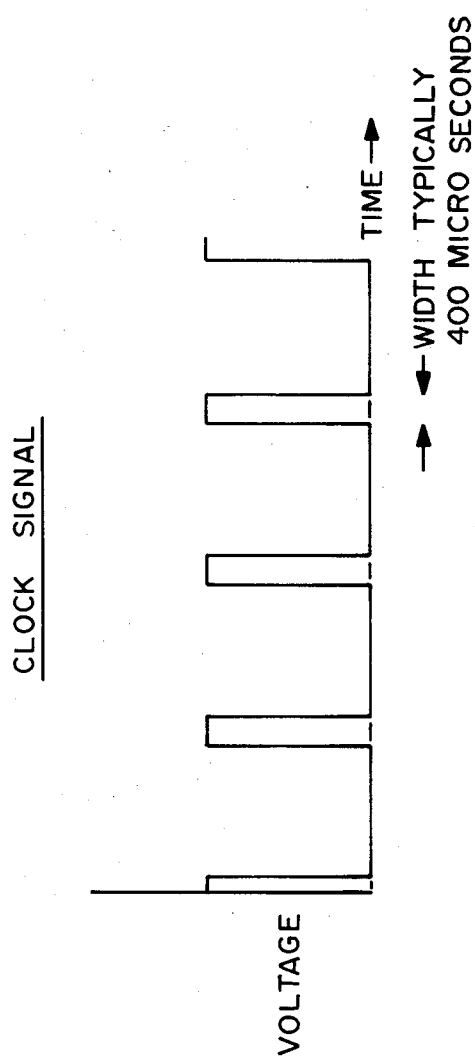
FIG. 3 illustrates a graph of the clock signal voltage vs. time.

The sub-circuit shown in dashed lines of box 7 generates a clock pulse at each zero crossing of the supply voltage. This waveform is illustrated in FIG. 3. The clock signal clocks form-D flip flops 26A and 26B, and transfers the logic levels present on the "D" inputs to the respect "Q" outputs.

The heater is always excited by a low level D.C. current. This current typically is about 10 millamperes, and does not substantially contribute to heating the sensor. The D.C. sensor current is selected so that the current value times the nominal sensor resistance at 25° C. will result in a voltage that is higher then the full wave voltage at the zero crossing for a time period of about 400 microseconds preceding the zero value, and about 400 microseconds following the zero value by way of example and for purposes of illustration. In this 800 microsecond time interval, a control amplifier 21A amplifies the sensor voltage. The output of amplifier 21A is then compared too the set point voltage which is set by a potentiometer 23, and appears as a D.C. value at the output of a set point amplifier 21B. The actual comparison is made by an operational amplifier comparator 21C. If the output of amplifier 21A is higher than the output of the amplifier 21B, the output of comparator 21C will be low. This low will be clocked to the "Q" output of the flip flop 26A on the falling edge of the clock pulse. The "Q" output will be a logic low. This indicates the heater is hotter than the selected set point. This will then turn off a transistor 30. When the transistor 30 is nonconducting, the output of power transistor 15 is rendered non-conducting, removing the full wave rectified voltage from the heater. The D.C. heater current is present, and the output of amplifier 21A is actively indicating heater temperature. When the output of the amplifier 21A decreases and is less than the set point amplifier 21B output, the comparator 21C will switch to a high logic level. When the next clock pulse occurs, the output of the flip flop 26A will switch high. This turns on the transistor 30, which turns on transistor 15, and again applies power to the heater.

Another enhancement of the control circuit 100 is that the circuit protects itself in the event that the heater short circuits. Typically when this happens, excessive current flows through the power transistor 15, and can destroy the device. A common prior art protection method might be to fuse the circuit with inherent cost and nuisance, but in this instance, comparator 21D and the flip flop 26B provide the necessary protection. The plus input is referenced to a low D.C. voltage by resistors 24 and 25. If the heater is short circuited, the output from the amplifier 21A drops to zero. When this occurs, the positive reference voltage on the plus input of comparator 21D switches the output of an amplifier 21D high. When the next clock pulse occurs, the "Q" output of the flip flop 26B will switch HI. This signal is connected to the reset input "R" of the flip flop 26A. Since reset has priority, the reset causes the "Q" output of the flip flop 26A to swtich LO turning off the transistor 30, and in turn the heater power by turning off the transistor 15.

An LED 31 indicates the status of the controller and heater power. When power is first applied and the heater is cold, the LED 31 will be on steady. When the heater is being cyclially controlled, the LED 31 cycles an and off with the heater power. If the heater short circuits, the LED stays off 100% until the fault is cleared. Resistor 17 and Zener diode 18 protect the amplifier 21A from possibly damaging voltage on the inputs during the major portion of the power cycle.

MODE OF OPERATION

Figure 2A:
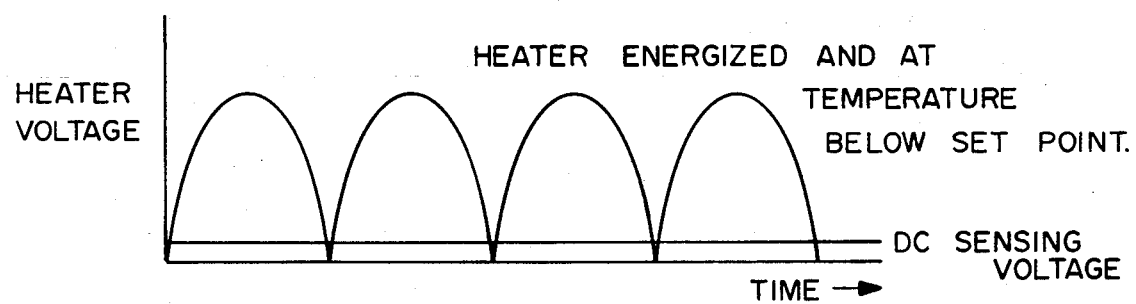
FIGS. 2A–2C illustrate a graph of the heater voltage vs. sensing voltage.
Figure 2B:
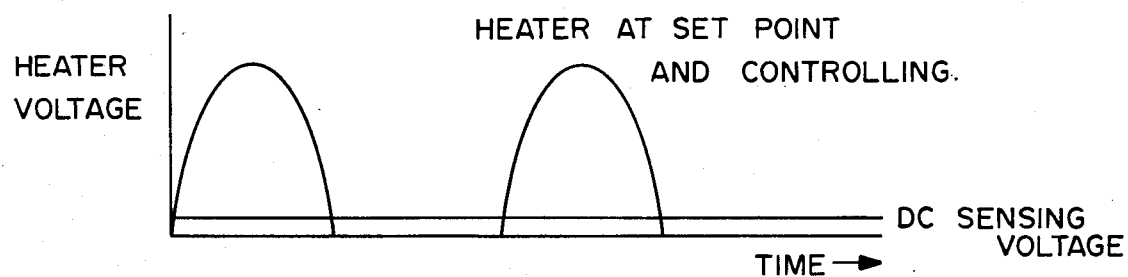
Figure 2C:
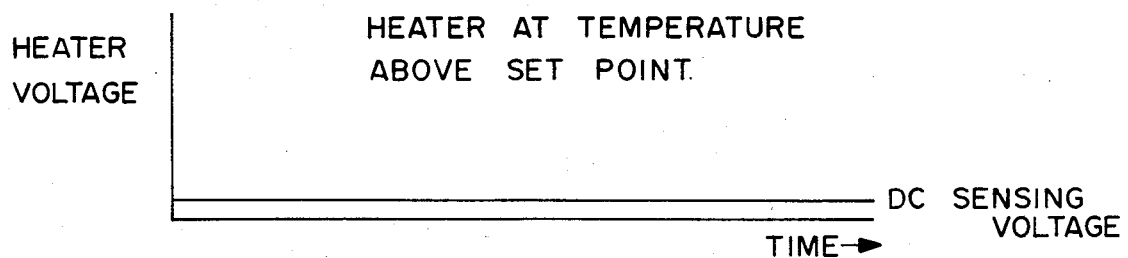

FIGS. 2A-2C illustrates the D.C. sensing voltage super imposed upon the heater voltage signal. Dependent upon the type of wire material which is utilized, the sensor voltage and current may very well be of the values previously set forth above by way of example for purposes of illustration only. The description of operation of the electrical circuit has been previously described in describing the electrical control circuit schematic diagram, and is not repeated here for the sake of brevity. It is important to note that any type of heater wire can be utilized so long as the heater wire has an appreciable, positive temperature coefficient of resistivity. FIG. 2A illustrates the heater energized and at a temperature below set point. FIG. 2B illustrates the heater energized at a temperature above set point. FIG. 2C illustrates the heater at a set point and controlling.

FIG. 3 illustrates the clock signal with a typical width of 400 microseconds, which is by way of example and for purposes of illustration only. Of course, other widths of clock signals maybe utilized.

Figure 4:
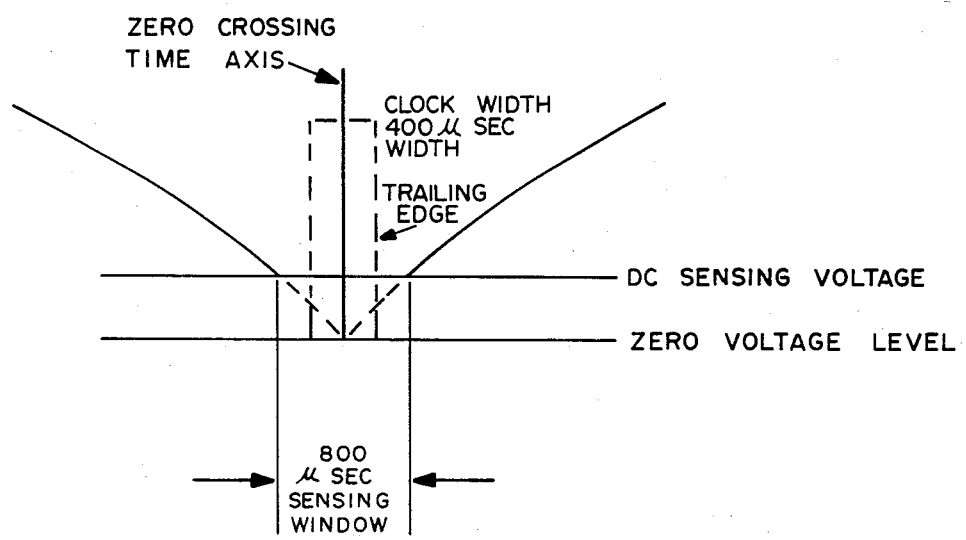
FIG. 4 illustrates a magnified view of the heater voltage vs. time at the zero crossing.

FIG. 4 illustrates a magnified view of the timing relation at the zero crossing with the clock pulse super imposed in the sensing window illustrating an 800 microsecond wide sensing window about a 400 microsecond width clock pulse. Zero voltage level is below the D.C. sensing voltage, and the clock pulse is centered about the zero crossing time axis.

Various modifications can be made to the present invention without departing from the apparent scope thereof.

I claim:
1. Integrated sensor controller for an electrical resistance heater having a heating element of a material exhibiting a positive temperature coefficient of resistivity, said controller comprising:
   a. first switching means connected to said heater for electrically connecting said heater to a source of alternating current power;
   b. clock pulse generating means responsive to said source of alternating current power for generating a clock pulse symmetrical about each zero crossing of said source of alternating current power;
   c. direct current supply means connected to said heater for energizing said heater with a small resistance sensing current to develop a heater temperature signal responsive to the temperature of said heater;
   d. setpoint means for generating a setpoint signal representing the desired predetermined temperature of said heater;
   e. heater temperature comparator means having first and second inputs connected to said heater temperature signal and said setpoint signal, and generating a first comparator output signal;
   f. short circuit comparator means having first and second inputs connected to said heater temperature signal and a positive reference voltage, and generating a second comparator output signal when the voltage across said heater drops below a minimum value;
   g. first flip flop means responsive to the output signal of said heater temperature comparator means and having an input connected to said clock means, a second switching means, said second switching means connected to said first switching means; and,
   h. second flip flop means responsive to the output signal of said short circuit comparator means, and having an input connected to said clock means, a reset of said first flip flop means for also switching said second switching means, whereby said heater is switched into an off condition when said heater is hotter than a selected sense point as sensed by said first comparator means or a short circuit is sensed across said heater.

2. Controller of claim 1 including a potentiometer means for setting said set point voltage.

3. Controller of claim 1 including an LED means connected between said second switching means and said heater for indicating status.

4. Controller of claim 1 including means for amplifying said heater temperature signal.

5. Controller of claim 1 wherein clock signals have a width of substantially 400 microseconds.

6. Controller of claim 1 wherein a sensing window of the direct current supply means has a sensing period of substantially 800 microseconds.

7. Controller of claim 6 wherein said clock pulse coincides with the sensing period window of said sensing current.

* * * * *